United States Patent
Jones et al.

(10) Patent No.: US 7,874,826 B2
(45) Date of Patent: Jan. 25, 2011

(54) SOLID INK STICK FABRICATION BY EXTRUSION, ROLL FORMING AND SWAGING

(75) Inventors: Brent Rodney Jones, Sherwood, OR (US); Gustavo J. Yusem, Tigard, OR (US); Edward F. Burress, West Linn, OR (US); Dan Leo Massopust, Powell Butte, OR (US)

(73) Assignee: Xerox Corporation, Norwalk, CT (US)

( * ) Notice: Subject to any disclaimer, the term of this patent is extended or adjusted under 35 U.S.C. 154(b) by 873 days.

(21) Appl. No.: 11/545,874

(22) Filed: Oct. 11, 2006

(65) Prior Publication Data

US 2008/0088054 A1   Apr. 17, 2008

(51) Int. Cl.
*B29C 47/90* (2006.01)
(52) U.S. Cl. .................. 425/144; 425/296; 425/325; 425/327; 425/377; 425/379.1
(58) Field of Classification Search ............... 425/143, 425/144, 296, 325, 327, 379.1, 377
See application file for complete search history.

(56) References Cited

U.S. PATENT DOCUMENTS

| | | | |
|---|---|---|---|
| 3,176,659 A | 4/1965 | Sauber | |
| 3,849,241 A | 11/1974 | Butin et al. | |
| 3,866,669 A * | 2/1975 | Gardiner | 165/254 |
| 4,271,757 A | 6/1981 | Maxwell et al. | |
| 4,340,563 A | 7/1982 | Appel et al. | |
| 4,847,090 A * | 7/1989 | Della Posta et al. | 424/440 |
| 4,889,560 A | 12/1989 | Jaeger et al. | |
| 4,889,761 A | 12/1989 | Titterington et al. | |
| 5,221,335 A | 6/1993 | Williams et al. | |
| 5,372,852 A | 12/1994 | Titterington et al. | |
| 5,460,757 A | 10/1995 | Hedgecoth | |
| 5,554,334 A | 9/1996 | Kashio et al. | |
| 5,621,022 A | 4/1997 | Jaeger et al. | |
| 5,734,402 A | 3/1998 | Rousseau et al. | |
| 5,861,903 A | 1/1999 | Crawford et al. | |
| 5,891,487 A | 4/1999 | Parise | |
| 6,267,918 B1 | 7/2001 | Bauer | |
| 6,284,184 B1 | 9/2001 | Choi et al. | |
| 6,284,291 B1 * | 9/2001 | Siecke et al. | 426/5 |

(Continued)

OTHER PUBLICATIONS

Non-Final Office Action for U.S. Appl. No. 11/546,102 Mailed Mar. 10, 2009, United States Patent and Trademark Office (12 pages).

(Continued)

*Primary Examiner*—Yogendra N Gupta
*Assistant Examiner*—Joseph Leyson
(74) *Attorney, Agent, or Firm*—Maginot, Moore & Beck LLP

(57) ABSTRACT

A method of manufacturing an ink stick for use in a phase change ink jet imaging device comprises heating phase change ink material to an extrusion temperature at which the phase change ink material is in a malleable state. The ink material is then extruded through an extrusion orifice to form an extruded rail of ink. The extruded rail of ink is then roll formed to partially form a portion of a shape transverse to the extrusion direction as the rail of ink moves in the extrusion direction. A swaging process is then carried out to further form and divide the extruded rail of ink into ink sticks.

12 Claims, 8 Drawing Sheets

U.S. PATENT DOCUMENTS

| | | | |
|---|---|---|---|
| 6,365,080 | B1 | 4/2002 | Parise |
| 6,558,727 | B2 * | 5/2003 | Degady et al. ............. 426/516 |
| 6,598,954 | B1 | 7/2003 | Moffat et al. |
| 6,719,399 | B2 | 4/2004 | McDougall et al. |
| 6,869,548 | B2 | 3/2005 | Matsumoto |
| 7,556,487 | B2 * | 7/2009 | Acar et al. ................ 425/72.1 |
| 2002/0017742 | A1 | 2/2002 | Kikuchi et al. |
| 2004/0125184 | A1 | 7/2004 | Sharma et al. |
| 2004/0176634 | A1 | 9/2004 | Titterington et al. |
| 2005/0088499 | A1 | 4/2005 | Jones et al. |
| 2008/0030559 | A1 | 2/2008 | Peters et al. |
| 2008/0087372 | A1 | 4/2008 | Jones et al. |
| 2008/0088053 | A1 | 4/2008 | Jones et al. |
| 2008/0088054 | A1 | 4/2008 | Jones et al. |

OTHER PUBLICATIONS

Amendment in Response to Non-Final Office Action for U.S. Appl. No. 11/546,102, submitted Jun. 10, 2009 (12 pages).

Final Office Action for U.S. Appl. No. 11/546,102 Mailed Aug. 31, 2009, United States Patent and Trademark Office (13 pages).

Amendment accompanying Request for Continued Examination for U.S. Appl. No. 11/546,102, submitted Nov. 30, 2009 (14 pages).

Second Non-Final Office Action for U.S. Appl. No. 11/546,102 Mailed Dec. 28, 2009, United States Patent and Trademark Office (12 pages).

Second Amendment in Response to Non-Final Office Action for U.S. Appl. No. 11/546,102, submitted Mar. 29, 2010 (9 pages).

Non-Final Office Action for U.S. Appl. No. 11/546,084 Mailed Apr. 2, 2009, United States Patent and Trademark Office (13 pages).

Amendment in Response to Non-Final Office Action for U.S. Appl. No. 11/546,084, submitted Jul. 2, 2009 (12 pages).

Final Office Action for U.S. Appl. No. 11/546,084 Mailed Nov. 3, 2009, United States Patent and Trademark Office (10 pages).

Amendment accompanying Request for Continued Examination for U.S. Appl. No. 11/546,084, submitted Jan. 29, 2010 (11 pages).

Second Non-Final Office Action for U.S. Appl. No. 11/546,084 mailed Mar. 3, 2010, United States Patent and Trademark Office (6 pages).

Amendment in Response to second Non-Final Office Action for U.S. Appl. No. 11/546,084, submitted Mar. 30, 2010 (13 pages).

Non-Final Office Action for U.S. Appl. No. 11/545,999 Mailed Jun. 15, 2009, United States Patent and Trademark Office (10 pages).

Amendment in Response to Non-Final Office Action for U.S. Appl. No. 11/545,999, submitted Sep. 15, 2009 (8 pages).

Third Non-Final Office Action for U.S. Appl. No. 11/546,102, Mailed Jun. 23, 2010, United States Patent and Trademark Office (15 pages).

Amendment in Response to Third Non-Final Office Action for U.S. Appl. No. 11/546,102, Submitted Aug. 23, 2010 (12 pages).

* cited by examiner

*FIG. 4*
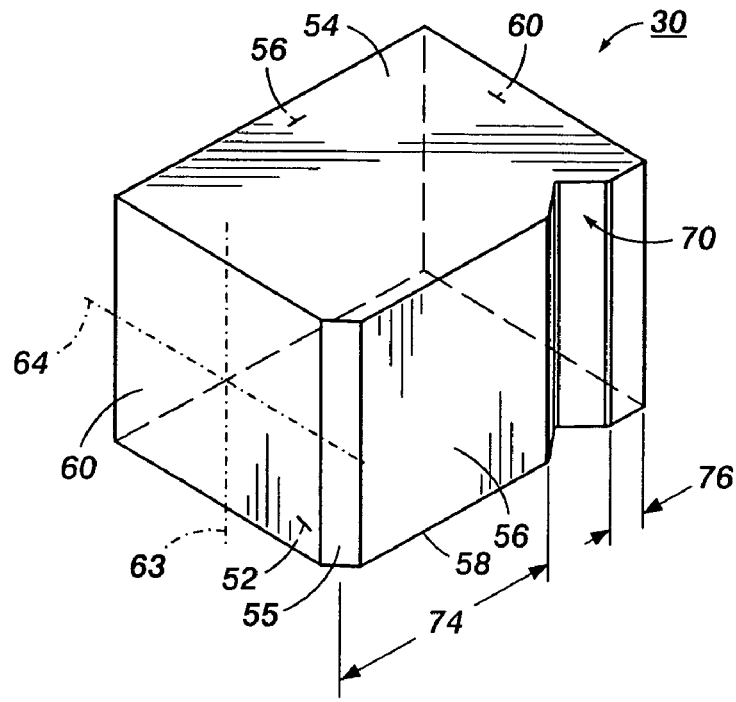
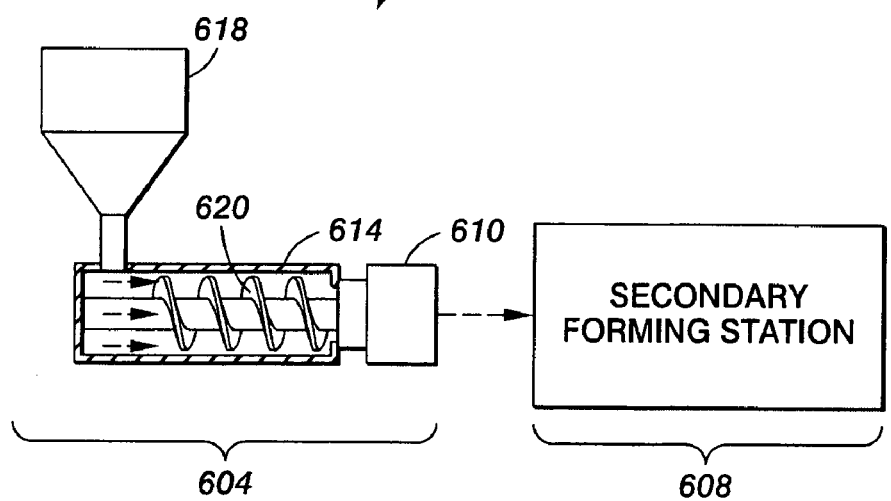
*FIG. 5*

SOLID INK STICK FABRICATION BY EXTRUSION, ROLL FORMING AND SWAGING

CROSS-REFERENCE TO RELATED APPLICATIONS

Reference is made to commonly-assigned copending U.S. patent applications Ser. No. 11/545,999, entitled "SOLID INK STICK FABRICATION BY FIBER EXTRUSION" by Jones et al., Ser. No. 11/546,102, entitled "FORGED INK STICK FABRICATION FROM IN-LINE EXTRUSION" by Jones et al., and Ser. No. 11/546,084, entitled "FLOW FILL MANUFACTURING OF SOLID INK STICKS WITH TOP SURFACE CONDITIONING" by Jones et al., each being filed concurrently herewith, the disclosures of which are incorporated herein.

TECHNICAL FIELD

This disclosure relates generally to phase change ink jet printers, the solid ink sticks used in such ink jet printers, and the methods used to fabricate such an ink stick.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed or urged by a spring through the feed chute toward a heater plate in the heater assembly. The heater plate melts the solid ink impinging on the plate into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Ink sticks currently in use are typically manufactured with a formed tub and flow fill process. In this method, the component dyes and carrier composition is heated to its liquid state and then poured into a tub having an interior shape corresponding to the desired finished ink stick shape. The tub may also be formed with indentations and protrusions for forming keying and coding features in the ink sticks, if desired. This manufacturing method allows formation of non-linear shapes, although dimensions for the sticks may vary beyond desired tolerance ranges. Poor height control and stress cracks may be caused by non uniform cooling of the ink. Specifically, the outer layer of the molten ink and carrier radiate heat to the outside air and cool more quickly than the interior portions of the mixture. This situation is worsened by the fact that the upper surface is an open top and cools at a different rate than the tub surround areas on the sides and bottom. Additionally, features cannot be formed in the upper surface with this method. The top surface nearly always solidifies into an uncontrolled, non flat shape such that stick to stick and areas across a stick vary in height. Poor height control can allow sticks to be undesirably displaced during handling and transport and even operation of the printer or imaging device. The flow fill process is used in spite of these limitations because it is very fast and cost effective. The process of extrusion is another method of generating forms with a lot of mass very quickly and economically. Extrusion, however, generates forms that incorporate features in the longitudinal direction only. Features perpendicular to the feed direction cannot be made directly.

SUMMARY

In one embodiment, a method of manufacturing an ink stick for use in a phase change ink jet imaging device comprises heating phase change ink material to an extrusion temperature at which the phase change ink material is in a malleable state. The heated ink material is then extruded through an extrusion orifice to form an extruded element. A forging element, is then pressed against the extruded element to form an ink stick.

Another aspect comprises a system for manufacturing ink sticks. The system includes a heater for heating phase change ink material to an extrusion temperature. An extruder extrudes the ink material through an extrusion orifice in an extrusion direction to form an extruded element. The system also includes a forming member for pressing a forming element against the extruded element to form an ink stick. As heat is introduced to the system via elevated temperatures of the ink material, various elements may increase in temperature beyond the ideal. The thermal controller may include a cooling unit to selectively effect cooling or not and to cool all or portions of the extrusion system to establish or maintain desired temperature of the components and/or extrusion material.

In yet another aspect, a system for manufacturing ink sticks comprise a heater for heating phase change ink material to an extrusion temperature and an an extruder for extruding the ink material through an extrusion orifice in an extrusion direction to form an extruded element. The system also includes a die for receiving the extruded element; a forming element for pressing against at least a portion of the extruded element received in the die to substantially fill the die with the extruded element and form an ink stick; and a separator for separating the formed ink stick from the die. Forming components may be temperature controlled, which generally

BRIEF DESCRIPTION OF THE DRAWINGS

FIG. 4 is a perspective view of one embodiment of a solid ink stick.

FIG. 5 is a schematic view of a system for forming solid ink sticks.

DETAILED DESCRIPTION OF THE PREFERRED EMBODIMENT

Figure 1:
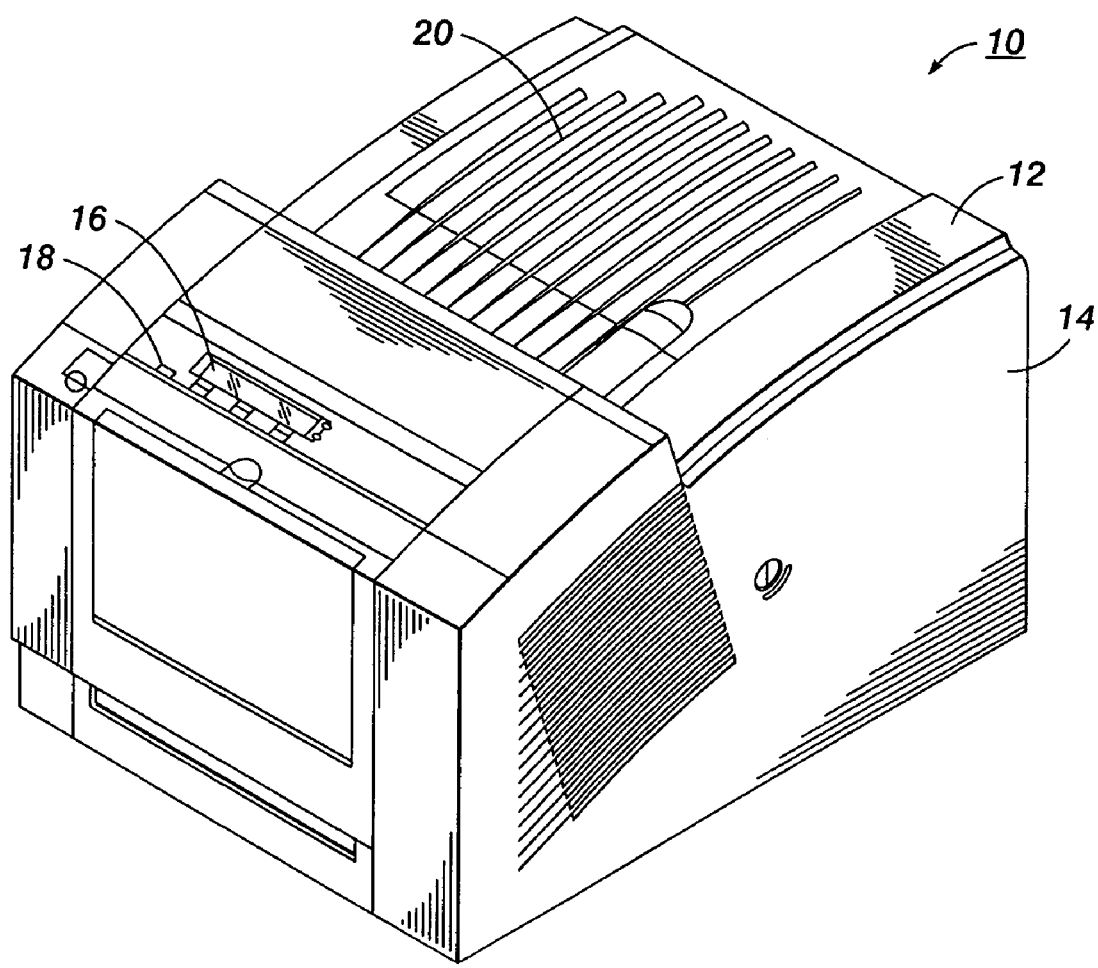
FIG. 1 is a perspective view of a phase change printer with the printer top cover closed.

For a general understanding of the present embodiments, reference is made to the drawings. In the drawings, like reference numerals have been used throughout to designate like elements.

Figure 2:
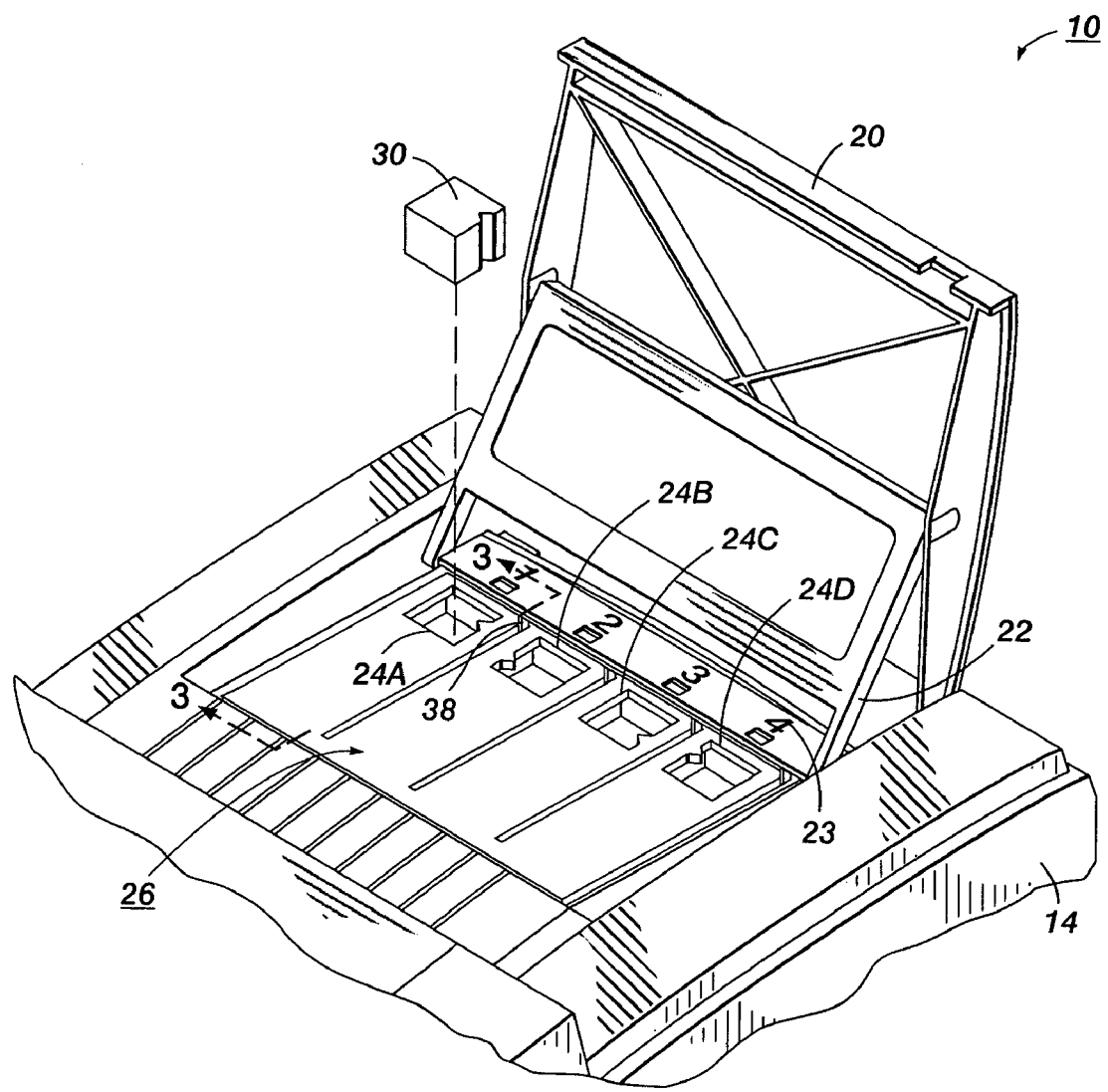
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

Figure 3:
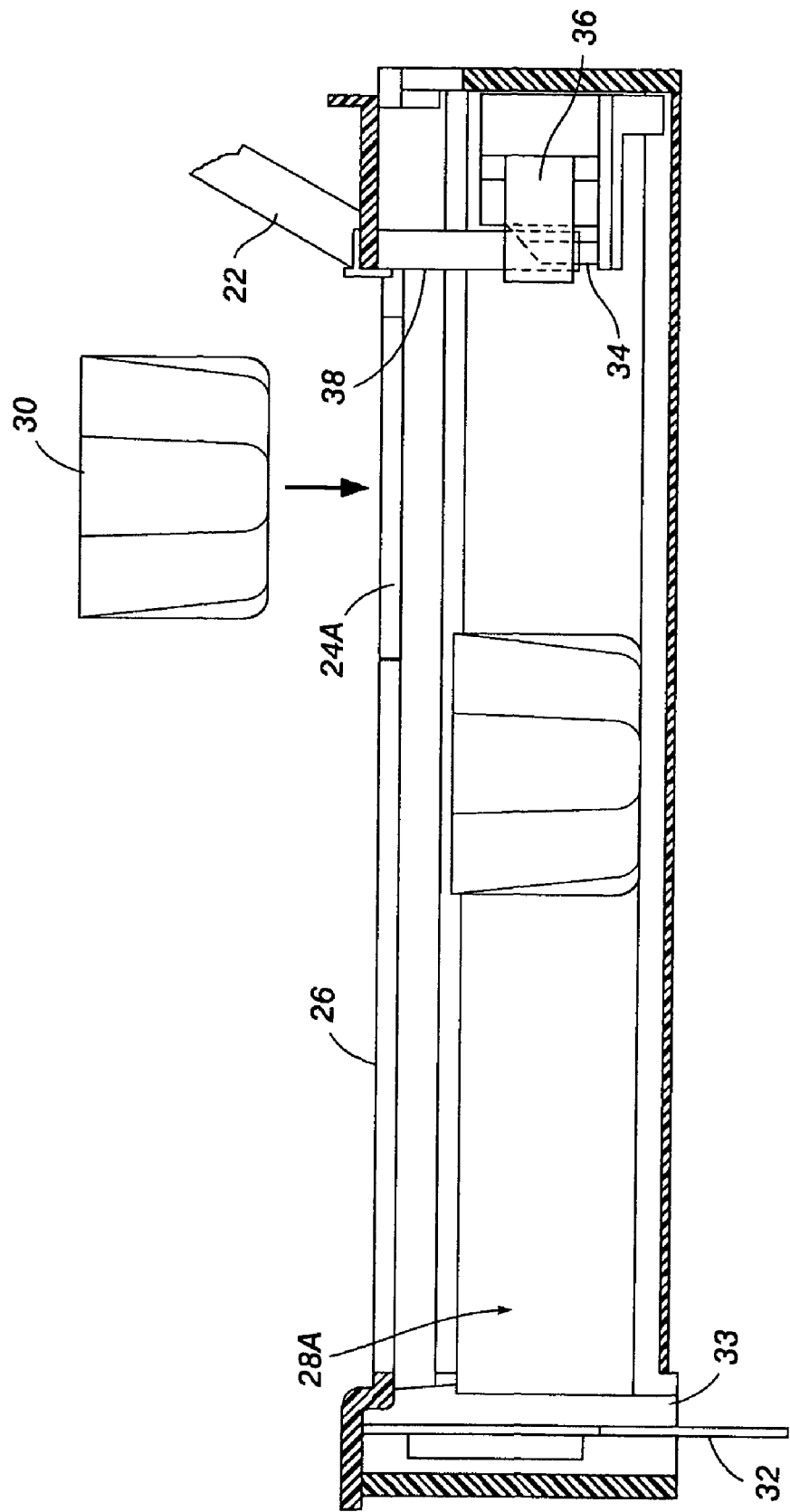
FIG. 3 is a side sectional view of a feed channel of a solid ink feed system taken along line 3-3 of FIG. 2.

In the particular printer shown, the ink access cover 20 is attached to an ink load linkage element 22 so that when the printer ink access cover 20 is raised, the ink load linkage 22 slides and pivots to an ink load position. As seen in FIG. 2, opening the ink access cover reveals a key plate 26 having keyed openings 24A-D. Each keyed opening 24A, 24B, 240, 24D provides access to an insertion end of one of several individual feed channels 28A, 28B, 28C, 28D of the solid ink feed system (see FIGS. 2 and 3).

Each longitudinal feed channel 28A-D delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28A-D have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. The ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26.

A color printer typically uses four colors of ink (yellow, cyan, magenta, and black). Ink sticks 30 of each color are delivered through a corresponding individual one of the feed channels 28A-D. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 240, 24D to aid the printer user in ensuring that only ink sticks of the proper color are inserted into each feed channel. Each keyed opening 24A, 24B, 240, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

An exemplary solid ink stick 30 for use in the feed channel is illustrated in FIG. 4. The ink stick is formed of an ink stick body having a bottom, represented by a general bottom surface 52, a top, represented by a general top surface 54, and at least two lateral extremities or sides, represented by general side surfaces 56. The ink stick is illustrated without the key shapes on the lateral sides that correspond to the key plate openings 24A-D through the key plate 26, to simplify the illustration. The surfaces of the ink stick body need not be flat, nor need they be parallel or perpendicular to one another. However, these descriptions aid the reader in visualizing, even though the surfaces may have three dimensional topography, or be angled with respect to one another. The bottom of the ink stick body is a bottom surface having lateral edges 58 at which the bottom surface 52 intersects the lateral side surfaces 56. The ink stick body may be formed in a substantially rectangular block in which the lateral side surfaces 56 are substantially parallel one another. Such a rectangular block form of the ink stick body also includes two end surfaces 60 that are substantially parallel to one another, and are substantially perpendicular to the side surfaces 56. Nevertheless, other shapes of the side and end surfaces are also possible, including curved surfaces.

The ink stick body can have a number of sides other than four. For example, the ink stick body can be formed with three, five, or virtually any number of side surfaces. These side surfaces need not be equal in length, nor is the ink stick body necessarily symmetrical about the lateral or vertical centers of gravity. In other shapes, the ink stick body can have surfaces that are curved. For example, the ink stick body can have a cylindrical shape, with the axis of the cylinder parallel the longitudinal feed direction of the feed channel, parallel the lateral dimension of the feed channel, or perpendicular to both the longitudinal feed direction and the lateral dimension (vertical).

The ink stick body can also be formed in shapes other than a cubic rectangle. For example, the ink stick can have an elliptical horizontal cross sectional shape, a shape having multiple straight linear sides, or even a combination of curved and linear sides.

The lateral dimension of the ink stick body between the side surfaces 56 is no wider than the lateral dimension of the ink stick feed channel 28 between the side walls 42, 44. The lateral dimension of the ink stick body between the side surfaces 56 is substantially the same as the lateral dimension of the ink stick feed channel 28 between the side walls 42, 44, or more specifically only fractionally smaller than the lateral dimension of the ink stick feed channel 28 between the side walls 42, 44.

The solid ink stick 30 is formed of a phase change ink composition comprising a phase change ink carrier composition and a phase change ink compatible colorant. The composition should typically be a solid at room temperature and have a melting point below the operating temperature of the printing equipment that is used to apply the molten ink to a substrate. When the phase change ink is heated to its molten state, the temperature of the composition continually rises until the melting point is reached. At this point, extra energy (latent heat of fusion) is required to complete the phase change from solid to liquid. The temperature of the phase change ink remains approximately at the melting point until enough heat has been added and the composition has completely transitioned from solid to liquid before the temperature of the composition begins to rise again. It should be noted that the absorption of heat by the phase change ink composition may occur more quickly at the surface than it does at internal volumes resulting in uneven melting depending on the shape of the solid ink mass.

Similarly, when the molten phase change ink is allowed to cool, the temperature of the composition stops falling at or just below the freezing point. At the freezing point, in order to complete the phase change from liquid to solid, the energy of the heat of fusion must be withdrawn. Once completely solidified, the temperature falls steadily again. The melting points and freezing points of the phase change ink composition vary depending on the properties of the materials used to form the composition. Heat absorption or loss occurs more quickly at the surface of the composition.

The foregoing description should be sufficient for purposes of illustrating the general operation of a phase change ink jet printer and the solid ink sticks utilized by such printers. Referring now to FIG. 5, there is shown an exemplary schematic diagram of a system 600 operable to form solid ink sticks. The system 600 includes an extrusion section 604 in which phase change ink is extruded into a generic cross-section ink form, and a secondary-forming section 608 in which the extruded ink form, while in a hot, malleable or semi-solid state, is processed into its final profile.

The extrusion section 604 includes an extrusion die 610, an extruder 614 for feeding material, under predetermined heat and pressure conditions, into the extrusion die 610, and a molten ink inlet 618 designed to receive molten phase change ink and feed the ink into the extruder 614. In the exemplary embodiment, the extruder 614 comprises a single screw extruder. Any desired or effective extruder can be employed, including twin screw extruders, co-rotating twin screw extruders (wherein both screws rotate in the same direction), counter-rotating twin screw extruders (wherein the screws rotate in opposite directions), pistons and the like. The extruder 614 has a molten ink inlet 618 mounted on top for receiving phase change ink in a molten (liquid) state and feeding the molten ink into the extruder 614. The molten ink inlet 618 may include one or more hoppers or feeders for receiving materials to be extruded.

The molten phase change ink is received in the molten ink inlet 618, and then introduced into the extruder 614. In the extruder 614, the molten phase change ink is selectively cooled until the ink reaches an extrusion temperature. Heating element(s) (not shown) in the extruder help maintain the phase change ink at the extrusion temperature before it is fed to the extrusion die. The extrusion temperature corresponds to the heat level that is conducive to maintain the ink carrier/colorant composition at the appropriate malleable state. When the phase change ink is a malleable or semi-solid, a somewhat paste like ink consistency is established for the composition which allows relatively low pressure feeding through the extrusion die and a high degree of formability. The specific material state, and hence the optimal extrusion temperature, is highly dependent upon the ink formulation and physical properties, which may be non-Newtonian. Achieving and maintaining the ideal temperature range for the appropriate consistency benefits from use of a thermal controller, i.e., system with a heater and/or cooler, temperature sensing and/or temperature control unit elements to regulate temperature, allowing the system to be heated or cooled as required. Heating specifically for the extrusion process may not be necessary if the material is furnished directly from a manufacturing process that includes mixing of molten material. Cooling may be accomplished with air flow. Cooling action would be selectively performed depending on the temperature of the material as it nears the extrusion die and/or other functional areas of the system.

A screw 620 in the extruder is operable to feed the phase change ink maintained at the extrusion temperature to the extrusion die 610 at a predetermined pressure and speed and force the ink through an extrusion orifice (not shown) of the extrusion die 610. The screw 620 may be helical or any other shape operable to mix and flow the semi-solid phase change ink through the extruder 604. There may be a temperature gradient along the length of the extruder and the ink within as it is fed through the extruder and brought into an ideal temperature for extrusion.

The extrusion die 610 has one or more orifices or apertures (not shown) through which the semi-solid phase change ink is forced (extruded). The extrusion die 610 is a shaping device with a streamlined orifice that reduces the extruder's stream of semi-solid phase change ink and generates an extruded element having a particular cross-sectional shape or geometry. The extrusion die 610 may be machined from alloy tool steel or aluminum or any other suitable material. Dies can be made to form a virtually limitless array of shapes and sizes. The extrusion orifice controls the thickness and width of the extruded material. The material is extruded through the extrusion die 610 to form an extruded element having a generic cross sectional form which may be circular, rectangular, or any other desired or suitable shape. After leaving the extrusion die 610, the extruded element, while still in a hot semi-solid state, is directed to the secondary-forming section 608.

Figure 6:
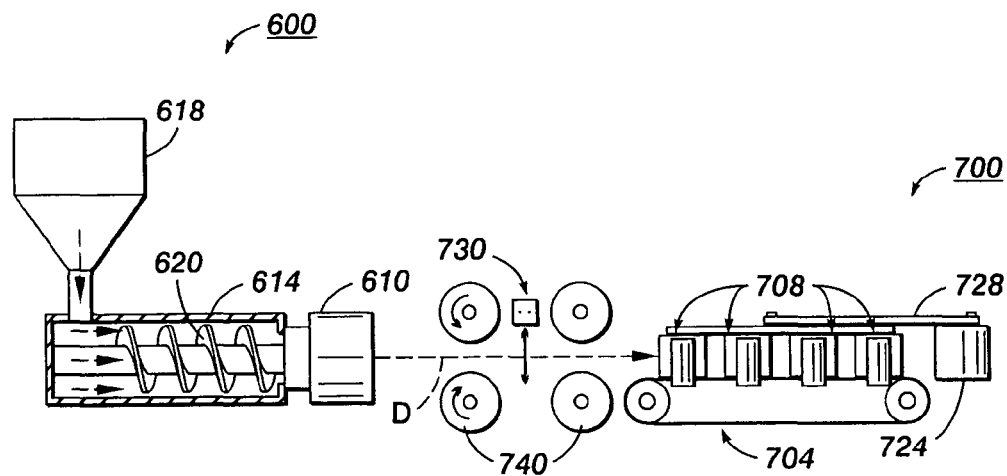
FIG. 6 is a side schematic view of an embodiment of the system for forming solid ink sticks of FIG. 5.

As shown in FIG. 6, in one embodiment, the secondary forming section 608 comprises a forming station 700 for forming an extruded element into a desired final shape and an extruded element transport 704 for transporting an extruded element (not shown) in the extrusion direction D. In the exemplary embodiment, the extruded element transport 704 comprises one or more conveyor belts configured to move an extruded element along the extrusion path from extruder to the forming station at a velocity corresponding to the extrusion velocity.

Figure 7:
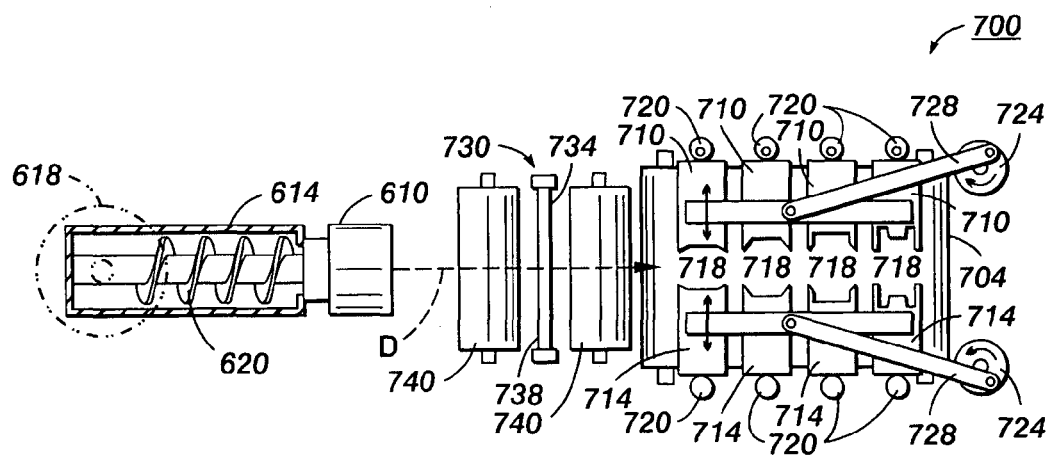
FIG. 7 is a top schematic view of an embodiment of the system for forming solid ink sticks of FIG. 5.

The forming station 700 includes one or more forming die sets 708 having a variable cross-sectional internal shape corresponding to the desired final shape of a solid phase change ink stick. Referring to FIG. 7, each forming die set 708 comprises a pair of mating forging or swaging elements 710, 714. The pair of forging elements 710, 714 cooperates to form a cavity 718 when pressed together having an internal shape corresponding to the desired final shape of a solid ink stick. The mating dies need not actually touch one another to effect the shape forming as long as the ink material properties constrain the material appropriately for subsequent forming influence. Three, four or more forming dies can be placed radially about the extrusion, oriented such that they mate sufficiently to form the desired forming cavity. Forging can also include plates with minimal or no internal shape for sizing, flattening, squaring, curving, corner sharpening or other preliminary or finalization forming. The forging elements 710, 714 are pressed together by the movement of a mechanism, which may be cams 720. The forming dies 708 follow the flow of the extruded element as it is moving through the forming station by the rotation of cams 724. Arms 728 may be affixed to cams 724 and to the respective forming elements. Cams 724 rotate thereby causing the forming dies 708 to move at the extrusion velocity in the extrusion direction as cams 720 rotate causing the forming elements 710 and 714 to be pressed together to enclose the extruded element in the cavity 718 so that the extruded element, while still in a semi-solid state, at least partially fills the internal shape of the cavity 718 and to at least some extent, takes its form. Once the extruded element is enclosed in the forming dies 708 and formed into the final ink stick shape, rotating cams 720 or an alternative mechanism move to open the forging elements 710, 714 thereby reciprocating the forging dies back into the starting position. Note that forming rollers and/or dies can form the ink shape in one operation or can partially influence ink shape continuously or at progressive forming stations. Single or progressive continuous or multiple station forming can be done with any one or combination of the described or alternative forming methods. It is to be understood that when describing an opposing pair of rollers or forming elements, it is inferred that multiple pairs could also be employed.

As shown in FIG. 7, forging elements 710, 714 are situated horizontally with respect to each other and to the extrusion path and on opposite sides. Alternatively, the pair of forming elements 740 may be oriented vertically with respect to each other and to the extrusion path. In this embodiment, one of the pair of forming elements comprises a lower forming element. The lower forming element is positioned on the transport to receive the extruded element as it is extruded from the extruder. An upper forming element is then pressed down toward the lower forming element by a piston or some other suitable method, thereby enclosing the extruded element within the forming elements so that the extruded element is modified in form by the internal shape of the cavity established by the forming elements. As an alternative to the piston activated forming dies, a rotary die set or other motion mechanism may be used. In this embodiment, the rotary die set comprises rolling dies that are rotated so as to roll along the outer surface of the extruded element as the extruded element moves in the extrusion direction.

The forming station may further comprise a cutting member 730 for trimming the extruded element at predetermined locations. Cutting member 730 comprises a first cutting element 734. To facilitate cutting, the first cutting element may be heated to a cutting temperature wherein the cutting temperature may be a temperature that is greater than the extrusion temperature of the extruded element. In order to ensure the cut portions of the extruded element do not bond back together, a second cutting element 738 may be included that is maintained at a temperature lower than the cutting temperature of the first cutting element. The cooler second cutting element 738 runs parallel to the first cutting element 734 and is located along the extrusion path between the first cutting element 734 and the extrusion die 610 spaced just far enough away from the hot cutting element 734 to prevent the halves of the extruded material cut by the hot cutting element 734 from bonding back together. In the exemplary embodiment, the first 734 and second cutting elements 738 comprise wires. Alternatively, a flying blade cutter or any other suitable device or method or combination may be used for trimming the extruded element at predetermined locations. Separation of the cut sections may also be facilitated by increasing the travel rate of the leading section after the cut is completed.

The forging station may further comprise guide members 740 for maintaining shape and controlling the position of the extruded element as it passes through the forming station. The guide members 740 may comprise roller pairs rotatably mounted adjacent the extrusion path about parallel axes in an abutting relation, with periphery of the one of the pair of rollers engaging, rolling upon and movable relative to the periphery of the other of the pair rollers. The roller pairs are rotated in opposite rotational directions at a velocity corresponding to the extrusion velocity. The peripheries of the roller pairs cooperate to define an opening therebetween that works to maintain the shape of the extruded element and control the position of the extruded element as it moves along the extrusion path to the forming station. In an exemplary embodiment, a first pair of rollers 740 may be located adjacent the extrusion die before a cutting member 730, and a second pair of rollers 740 may be located on the extrusion path after the cutting member 730.

While all of the elements of the forming section may be mounted and supported individually along the extrusion path, alternatively, all of the elements may be mounted on or included in a single structure. This structure may be provided with a reciprocating cyclic motion to follow the extrusion velocity during the forming stage and then reset to the starting point for the next cycle.

As this process may benefit from an excess volume of ink to be placed in a given forging die to fill all features, the forging station includes an overflow control (not shown) which may include directing the resultant overflow of ink toward the extruded mass side of the die to minimize or eliminate material that may need to be re-melted or recycled through the extruder. Separating the final formed ink sticks from one another may be a function of the forming dies or a separate cutting station or any other suitable method. Ink formulations and ink stick size and configurations vary such that specific extrusion temperature, extrusion force, extrusion speed, the number of forging dies and their temperature, the number and function of supplementary rolling dies and their temperature and other operations and equipment parameters must be varied to achieve optimum results.

Figure 8:
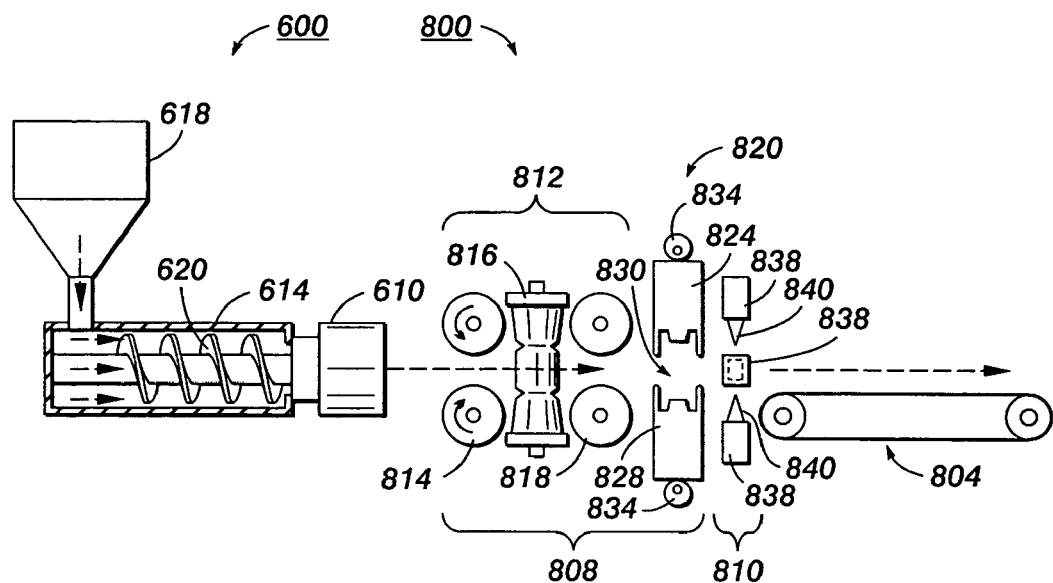
FIG. 8 is a side schematic view of an embodiment of the system for forming solid ink sticks of FIG. 5.

In another embodiment, the secondary forming section 608 comprises a roll forming and swaging station 800. Referring to FIG. 8, the roll forming and swaging station 800 includes an extruded element transport 804, a roll forming section 808 and a forging or swaging section 810. The term swaging generally used here for convenience to differentiate from forging by suggesting "squeezing" dies that are capable of shape modification to pre roller formed sections of the extruded material and/or severing the formed portion of the extrusion material from the extruded portion. The extruded element transport 804 is similar to and has the same operation as the extruded element transport 704. In this embodiment, the extruder extrudes a rail of malleable phase change ink (not shown) having the generic cross-sectional form dictated by the extrusion die 610. The extruded element transport 804 is configured to transport the extruded rail of ink through the roll forming and swaging station 800 at a velocity corresponding to the extrusion velocity.

Figure 9:
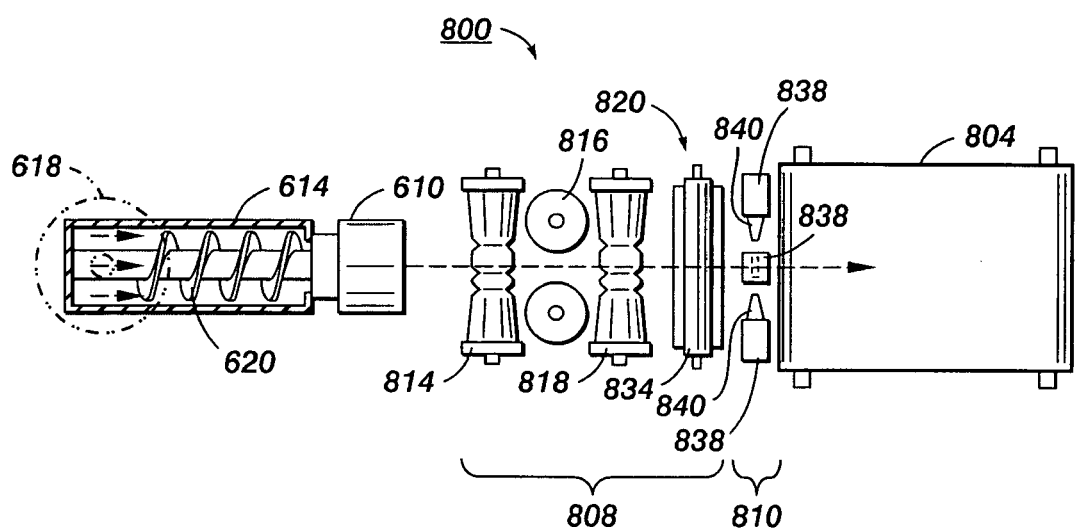
FIG. 9 is a top schematic view of an embodiment of the system for forming solid ink sticks of FIG. 5.

Referring to FIG. 8, the roll forming section 808 comprises roller guides 812 for establishing a substantial representation of the longitudinal shape in the extruded rail of ink. The forming die 820 further shapes a portion of the shape transverse to the longitudinal in the extruded rail of ink. The roller guides 812 comprises roller pairs 814, 816, 818 rotatably mounted adjacent about parallel axes in an abutting relation, with periphery of the one of the pair of rollers engaging, rolling upon and movable relative to the periphery of the other of the pair rollers. The roller pairs 814, 816, 818 are rotated in opposite rotational directions at a velocity corresponding to the extrusion velocity. The peripheries of the roller pairs cooperate to define an opening therebetween that works to both maintain and controllably alter the shape of the extruded element and control the position of the extruded element as it moves along the extrusion path to the forging station. In an exemplary configuration, as shown in FIGS. 8 and 9, roller pairs 814 and 818 are situated so that one roller of the pair is above the extrusion path and the other roller is below the extrusion path for longitudinally shaping the top and bottom of the extruded rail of ink. Roller pair 816 is situated laterally with respect to the extrusion path for shaping the lateral sides of the extruded rail of ink. Note that non forming rollers or plates which constrain or maintain the existing shape of a given area of the extruded material may be used in conjunction with forming elements of any described or alternative post extrusion forming process to ensure that the ink formation extends to the material areas intended to be shaped rather than causing imprecise placement or uncontrolled deformation.

The forming die 820 comprises forming elements 824, 828. The pair of forming elements 824, 828 cooperates to form a cavity 830 when pressed together having an internal shape corresponding to a portion of the desired final shape of a solid ink stick. The forming elements 824, 828 are pressed together by the movement of cams 834. Cams 834 rotate causing the forming elements 824, 828 to be moved toward each to partially enclose the extruded element in the cavity 830 thereby further shaping a portion of the shape transverse to the longitudinal in the extruded rail of ink.

Once the extruded rail of ink has been longitudinally shaped by the roller guides 812 and forming die 820, the longitudinally shaped rail is moved to the swaging section 810. The swaging section 810 is configured to perform a swaging process on the shaped rail of ink to establish the final form and cut the rail of ink into individual sticks. Referring again to FIGS. 8 and 9, the swaging section 810 may comprise a plurality of swaging members 838. The swaging members 838 may be disposed radially at approximately 90 degree intervals about the extrusion path. Each of the swaging members 838 may be slidably mounted in a position to radially engage the ink rail to produce the desired swage thereof. While two such swaging members 838 are shown, the device could have any suitable number of swaging members 838. Each swaging member 838 at their radially inner ends carry respective swaging dies 840. Each swaging die 840 is configured to impart a predetermined shape and finish forming the shape transverse to the longitudinal shape of the extruded rail of ink and to divide the rail of ink into individual sticks having essentially the final desired shape. Note that secondary swaging, or forging may not be required after roll forming, depending on the intended shape of the final ink form.

In one embodiment, the swaging members 838 may be driven in a reciprocating manner. As the extruded rail of ink enters the swaging section 810, the swaging members 838 are radially driven by swage drivers (not shown) to a position that impresses a shape in the rail and then returns to a home position. The swage drivers may comprise any known or suitable means of driving mechanical elements in a reciprocating manner, such as electrically, hydraulically, or pneumatically controlled actuators. Adjacent swaging members 838 may be actuated in alternation so that they can engage the ink rail throughout its contour without a mutual interference of the dies. The swaging members 838 may be actuated simultaneously if there is enough spacing between dies.

As noted above, the rail of ink is longitudinally shaped in the roll forming section 808 before it reaches the swaging section 810. The swaging section 810 is configured to process the extruded rail of ink into its final form by swaging and separating the rail into individual ink sticks. While the swaging members 838 have been described as having a linear or radial motion, alternatively, a swaging device may be provided having pivoting or rocker motion or any similar or appropriate action.

The extrusion and forming process elements would ideally produce an ink stick with all size control and features required of the final form, however, it may be desired to produce a non final form with additional forming steps in a separate finishing process. As an example, a family of products using an ink stick set that has only slight feature variability for the different models, such as a sensing feature, may encourage fabrication and inventory of a common basic shape that is further modified based on sales demands for the intended product. A variety of form modification methods could be employed to accomplish the final shape and/or appearance change, including additional forging or swaging, drilling, milling, sawing, melting with a heated form tool, filling one or more cavities or insets with a plug or molten material, adding nomenclature by stamping or other method, adding a bar code or other optically readable sensing element and so forth.

Figure 10:
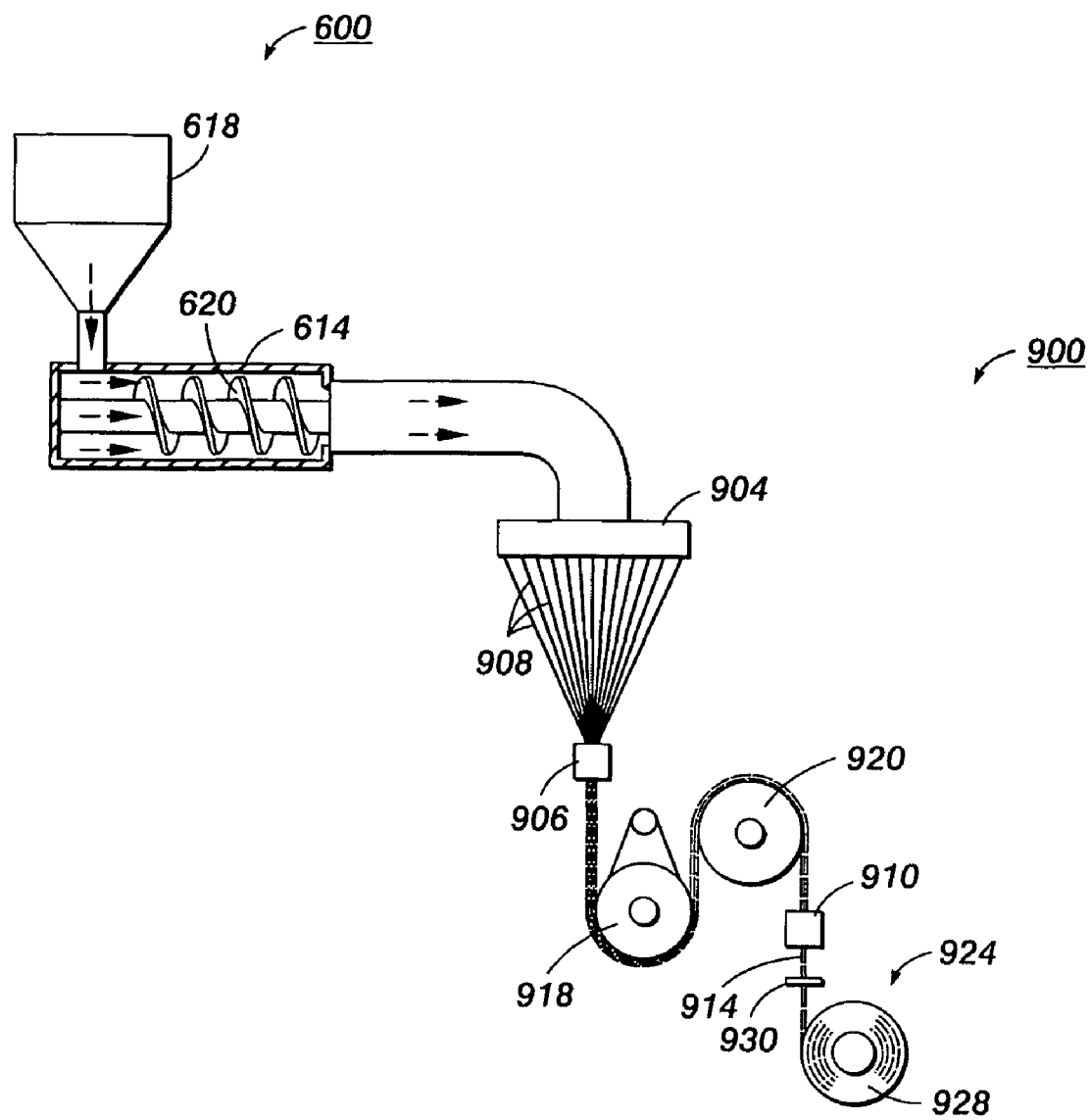
FIG. 10 is a schematic view of another embodiment of the system for forming solid ink sticks of FIG. 5.

In yet another embodiment, the secondary forming section 608 comprises a fiber processing station 900 for accumulating an extruded element that is extruded as fibers or filaments 908 (See FIG. 10). In this embodiment, the extrusion die comprises a spinneret 904 possessing one or more orifices or apertures (not shown) of a desired diameter to provide one or more ink filaments 908. As used herein, an extruded ink fiber or filament comprises an extrusion of ink material having at least one cross-sectional dimension transverse to the extrusion direction that is sufficiently thin to facilitate flexibility and mechanized handling of the fiber without breaking. In one embodiment, extruded filaments of ink 908 have a cross-section of less than approximately 6 mm. Flexibility generally improves with smaller filaments and can have cross-sections of 1 or 2 mm or even smaller. The apertures of the spinneret 904 can be of any appropriate desired cross-sectional size and shape. In the exemplary embodiment, the cross-sections of the apertures are round, but square, triangular, oval or other shaped cross-sections are contemplated. In FIG. 10, the apertures in the spinneret are arranged in a single row. However, the aperture pattern in the spinneret may be of any desired configuration including multiple rows, a matrix pattern or one or more concentric circles.

In one embodiment, the fiber processing station is configured to accumulate extruded ink filaments by coiling the extruded filaments around a coiling element. In this embodiment, individual ink filaments are passed to a coiling member 924 where the ink filament is wound around a coiling element 928, such as a winding spool or bobbin, with the aid of a traverse 930 to form a package. The filament is wound on the coiling element 928 until an appropriate diameter is reached depending on the size of the intended coil package. The coiling member 924 may further include a cutting member (not shown) positioned adjacent the coiling element 914 for cutting the fiber when the appropriate diameter has been reached. The fiber processing station may include a coiling member for each filament extruded through the spinneret. Thus, in one embodiment, a plurality of ink filaments may be extruded simultaneously and routed to separate coiling members for accumulation. A variation to this would be to more densely package the filament by using a fold rather coil approach, such as an overlapping FIG. 8 or zigzag formation.

In another embodiment, the fiber processing station may be configured to combine a plurality of ink filaments into a multi-fiber or multi-filament strand of ink before accumulation. In this embodiment, following extrusion through the spinneret 904, a plurality of filaments 908 may be collected downstream from the spinneret 904 by a converging guide 906 before proceeding to a filament arranging or bundling member 910. Converging guide 906 may be a pigtail type eyelet, a slotted roller, or any conventional converging or collecting means. Once the filaments 908 are converged, the filaments 908 may be wrapped around a hub 918 and one or more additional hub, for example, hub 920, to take up and adjust the tension on the filaments 908.

The filaments 908 then proceed to the filament bundling member 910. The filament bundling member 910 is configured to bundle the filaments 908 into an integrated fiber bundle 914 having a multiple fiber cross-section by twisting, spiraling, weaving, braiding, or interlacing and the like. In another embodiment, the fiber bundling member 910 may be configured to process the filaments 908 into a bonded fiber bundle. In this embodiment, the filaments 908 are bonded together by melting successive portions of adjacent fibers together or applying a controlled amount of molten ink to portions of adjacent fibers. The bonded fiber bundle may be formed by bonding the entire lengths of adjacent fibers, creating a solid ink "log" with a screw-like periphery. Alternatively, the filaments 908 may be bonded together using any bonding method such as mechanical bonding, thermal bonding, and chemical bonding.

The integrated or bonded filament bundle 914 may then be passed to coiling member 924 where the bundle 914 is wound around a coiling element 928, such as a winding spool or bobbin, with the aid of a traverse 930 to form a package. The bundle 914 is wound on the coiling element 928 until an appropriate diameter is reached depending on the size of the intended coil package. The coiling member 924 may further include a cutting member (not shown) positioned adjacent the coiling element 914 for cutting the fiber when the appropriate diameter has been reached. In another embodiment, the accumulator would cut and stack the extruded filament(s) into stick like pieces.

Due to the small cross-section of each fiber in a fiber bundle, a solid ink configuration formed of such a bundle exhibits beneficial melting characteristics. For instance, the small cross-sections of the fibers provides a solid ink stick with increased surface area to volume for more efficient melting and flow rate. Once a fiber bundle 914 of the desired size and configuration has been formed, the fiber bundle 914 may be coiled as described above or cut to any length and straightened, bent, or shaped as desired for insertion into final packaging. The final filament cross-section size or bundle size may be targeted at various levels of stiffness and flexibility, depending on the print engine ink staging and delivery system requirements.

Figure 11:
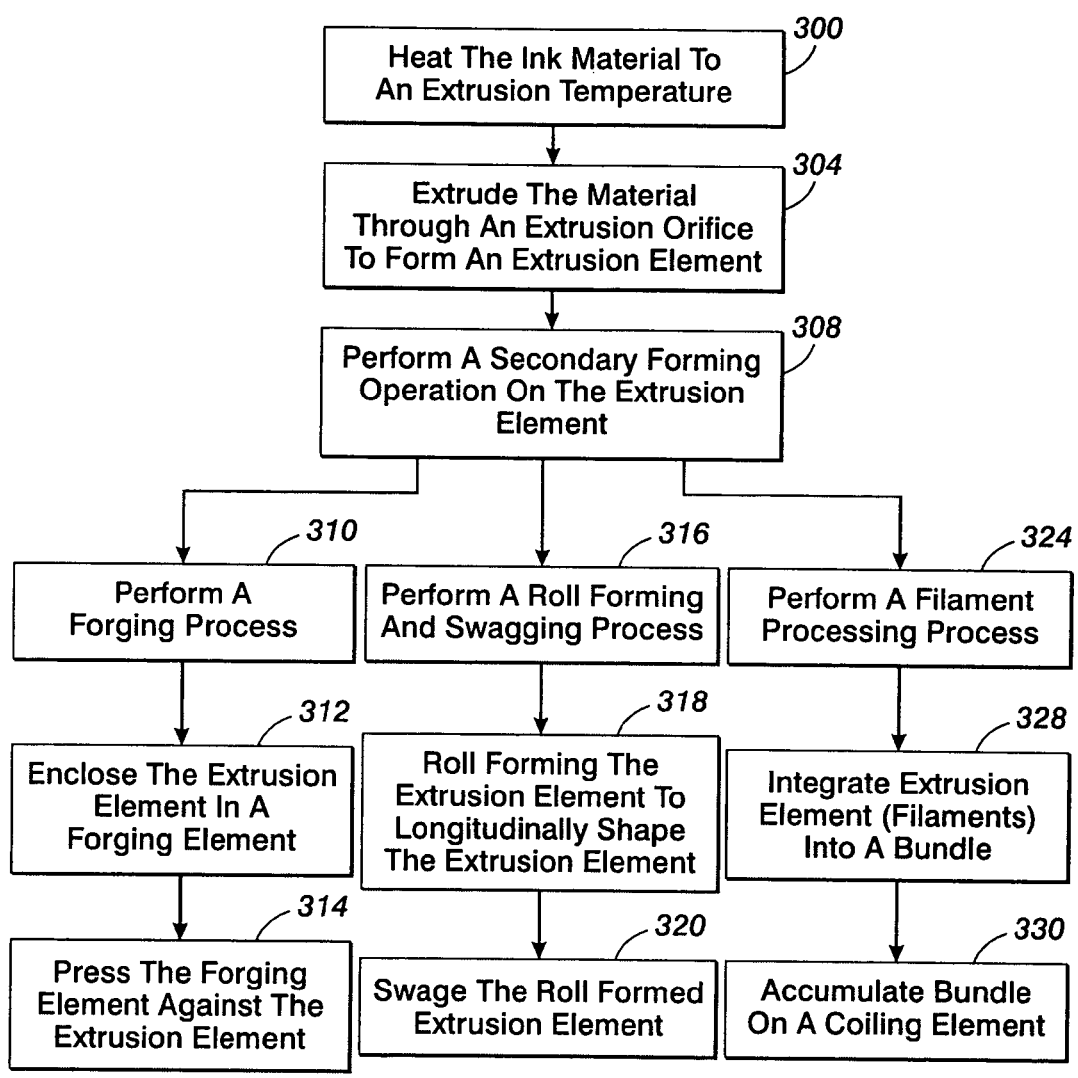
FIG. 11 is a flowchart for a method of forming solid ink sticks.

FIG. 11 is an exemplary flow diagram of a method of forming solid ink sticks by extrusion and secondary forming processes. The method comprises heating the phase change ink material to an extrusion temperature (Block 300). As mentioned above, the ink composition is maintained at a heat level that enables the extruded strand to remain a malleable semi-solid, exhibiting properties between solid and liquid. The ink is then extruded in an extrusion direction through an extrusion orifice to form an extruded element (Block 304). A secondary forming process is performed on the extruded element (Block 308).

In one embodiment of the method illustrated in FIG. 11, the secondary process is a forging process (Block 310). In this embodiment, after extrusion, the extruded element is enclosed in a forging element (Block 312). The extruded element has a variable cross-sectional internal shape along the extrusion direction. The extruded element is then pressed against the forging element so that the malleable ink material substantially fills the internal shape of the forging element (Block 314).

Alternatively, the secondary forming process is a roll forming and swaging process (Block 316). In this embodiment, after extrusion, the extruded element is roll formed to substantially establish the longitudinal shape of the extruded element (Block 318). Subsequently, the roll formed extruded element is swaged to establish the final form and cut into individual ink sticks (Block 320). For sticks with single axis formed shapes, rolling alone might be sufficient to establish the final form.

In yet another embodiment, the secondary forming process comprises a filament processing process (Block 324). In this embodiment, the extruded element comprises an extruded fiber having a cross-section generally no greater than 12 mm and optimally 6 mm or smaller. After extrusion, the extruded filaments are integrated or bonded into a filament bundle by weaving, spiraling, interlacing and the like (Block 328). Once the filaments have been integrated or bonded to form a bundle, the bundle is accumulated by winding onto a coiling element (Block 330). Specific diameters are less important that the flexibility of the end configuration based on material properties and environmental conditions the ink is exposed to at the time of use. Flexible ink material might allow diameters of 25 mm and inflexible material might require diameters less than 6mm, as example. The criteria for establishing acceptable size is therefore based more on real world fracture tendencies of a given system and ink formulation. Ink to be fed in fiber form should be free to be straightened for feed without fracturing at operational temperatures and feed rates. Ink fractruing has exhibited a tendency to be influenced by the rate at which it is uncoiled or straightened, so a larger diameter fiber that is more slowly fed into a melt device may be less prone to fracturing that a smaller diameter fed more rapidly at an equivalent melt rate.

Those skilled in the art will recognize that numerous modifications can be made to the specific implementations described above. Those skilled in the art will recognize that the extruded ink may be forged, rolled, swaged and coiled to any extent and in any combination and into numerous shapes and configurations other than those illustrated. In addition, numerous other configurations of the stations, sections and other components of the ink stick forming system can be constructed within the scope of the disclosure. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for manufacturing ink sticks for use in a phase change ink jet imaging device, the system comprising:
    an extruder having a molten ink inlet through which melted ink is received and an extrusion orifice;
    a thermal controller operatively connected to a heater and a cooler, the cooler being positioned proximate the extrusion orifice, the thermal controller being configured to control the heater to heat the melted ink in the extruder and to control the cooler to cool the melted ink as the melted ink nears the extrusion orifice to establish a temperature gradient in the extruder and produce an extrusion of malleable ink extending through the extrusion orifice;
    a roll forming member configured to roll form a rail of ink from the malleable ink extending from the extrusion orifice and form a portion of a shape transverse to an extrusion direction as the rail of ink moves in the extrusion direction;
    a forming die having a pair of forming elements, the forming elements being driven toward each other to engage the rail of ink after the rail of ink has been roll formed to impart a portion of a final shape for an ink stick to a portion of the rail of ink;
    a plurality of swaging members, each swaging member having a swaging die positioned at an end of each swaging member, each swaging die being configured to establish a final form for an ink stick and to divide the rail of ink into a plurality of ink sticks; and
    an actuator operatively connected to the plurality of swaging members, the actuator being configured to drive the swaging members in a reciprocating direction to urge the swaging dies into the extruded rail of ink to divide the extruded rail of ink into ink sticks.

2. The system of claim 1, the roll forming member comprising a rotating die configured to rotate along an outer surface of the extruded rail of ink as the rail moves in the extrusion direction.

3. The system of claim 2, the rotating die comprising a pair of rotating dies that are rotatably mounted on opposite sides of an extrusion path along which the extruded rail of ink moves, the rotating dies cooperating to form at least a partial cavity defining the portion of the shape transverse to the extrusion direction.

4. The system of claim 3, the rotating dies being configured to position the extruded rail along the extrusion path as the rail moves in the extrusion direction.

5. The system of claim 1, further comprising a transport member configured to transport the extruded rail of ink along an extrusion path from the extruder orifice to the roll forming member, from the roll forming member to the forming die, and from the forming die to the plurality of swaging members.

6. The system of claim 5, the plurality of swaging members being radially disposed about the extrusion path.

7. The system of claim 6, the swaging members in the plurality of swaging members being placed at multiple stations spaced along the extrusion path to form the ink stick shape progressively.

8. The system of claim 1, further comprising at least one pair of roller guides for guiding the extruded rail of ink along an extrusion path.

9. A system for manufacturing ink sticks for use in a phase change ink jet imaging device, the system comprising:
    an extruder having a molten ink inlet through which melted ink is received and an extrusion orifice;
    a thermal controller operatively connected to a heater and a cooler, the cooler being positioned proximate the extrusion orifice, the thermal controller being configured to control the heater to heat the melted ink in the extruder and to control the cooler to cool the melted ink as the melted ink nears the extrusion orifice to establish a temperature gradient in the extruder and produce an extrusion of malleable ink extending through the extrusion orifice;
    a transport member for transporting a rail of ink extending from the extrusion orifice along an extrusion path;
    a roll forming member disposed on the extrusion path, the roll forming member being configured to roll form the rail of ink extending from the extrusion orifice and form a portion of a shape transverse to a longitudinal axis of the rail of ink as the rail of ink moves along the extrusion path;
    a forming die having a pair of forming elements, the forming elements being driven toward each other to engage the rail of ink after the rail of ink has been roll formed to impart a portion of a final shape for an ink stick to a portion of the rail of ink;
    a plurality of swaging members, each swaging member having a swaging die positioned at an end of each swaging member, each swaging die being configured to establish a final form for an ink stick, the swaging members being radially disposed about the extrusion path after the roll forming member, each swaging member in the plurality of swaging members including a swaging die at an inner end to divide the extruded rail of ink into ink sticks; and
    an actuator operatively connected to the plurality of swaging members, the actuator being configured to drive the swaging members in a reciprocating direction to urge the swaging dies into the extruded rail of ink to divide the extruded rail of ink into ink sticks.

10. The system of claim 9, further comprising guide members configured along the extrusion path to guide the extruded rail of ink and to position the extruded rail of ink along the extrusion path.

11. The system of claim 9, the thermal controller being operatively connected to the roll forming member and the swaging members and being further configured to control operation temperatures of the roll forming member and the swaging members.

12. The system of claim 9, the thermal controller being further configured to control post extrusion and formation temperatures of the extruded rail of ink material.

* * * * *